(12) United States Patent
Englebert et al.

(10) Patent No.: US 7,819,959 B2
(45) Date of Patent: Oct. 26, 2010

(54) GAS QUENCH AND SCRUBBER DRAW-OFF SYSTEM

(75) Inventors: Benoit Englebert, Meise (BE); Gerard Blaure, Ecaussinnes (BE); Kevin J. Smith, Monongahela, PA (US)

(73) Assignees: S.A. SNC-Lavalin Europe N.V., Brussels (BE); Carmeuse Lime, Inc, Pittsburgh, PA (US)

( * ) Notice: Subject to any disclaimer, the term of this patent is extended or adjusted under 35 U.S.C. 154(b) by 362 days.

(21) Appl. No.: 10/583,005

(22) PCT Filed: May 3, 2006

(86) PCT No.: PCT/US2006/017153

§ 371 (c)(1),
(2), (4) Date: May 19, 2008

(87) PCT Pub. No.: WO2007/130035

PCT Pub. Date: Nov. 15, 2007

(65) Prior Publication Data

US 2008/0305017 A1  Dec. 11, 2008

(51) Int. Cl.
*B01D 53/14* (2006.01)
*B01D 53/34* (2006.01)

(52) U.S. Cl. .................. 96/271; 96/322; 261/115; 422/169

(58) Field of Classification Search ............ 96/243, 96/267, 271, 322, 237, 239; 95/235; 261/115, 261/DIG. 9; 423/242.1, 243.01; 422/168, 422/169
See application file for complete search history.

(56) References Cited

U.S. PATENT DOCUMENTS

| 3,148,042 | A | * | 9/1964 | Waldemar et al. | ............. 96/266 |
| 3,835,796 | A | * | 9/1974 | Sanga | ................ 110/119 |
| 4,110,088 | A |   | 8/1978 | Cold et al. | ................ 55/90 |
| 4,127,621 | A |   | 11/1978 | Berst et al. | ............... 261/118 |
| 4,469,493 | A | * | 9/1984 | Tuovinen et al. | ............. 95/201 |
| 5,154,734 | A |   | 10/1992 | Yung | ................ 55/4 |
| 5,645,802 | A | * | 7/1997 | Yanagioka et al. | ......... 422/170 |
| 6,695,018 | B2 |  | 2/2004 | Johnson et al. | ............... 141/70 |
| 2004/0011200 | A1 | | 1/2004 | Goode et al. | ............... 95/199 |
| 2005/0013757 | A1 | * | 1/2005 | Windschmitt et al. | ..... 423/242.1 |

FOREIGN PATENT DOCUMENTS

| EP | 0363009 | 4/1990 |
| GB | 2 050 325 | 1/1981 |
| JP | 62-225226 A | * 10/1989 |

* cited by examiner

*Primary Examiner*—Frank M Lawrence
(74) *Attorney, Agent, or Firm*—Kratz, Quintos & Hanson, LLP

(57) ABSTRACT

A gas desulfurization scrubbing system for removing sulfur oxides from gases, such as those of fossil fuel burning operations or other manufacturing process emitting sulfur oxides, and for collecting reaction products of the desulfurization chemical reactions. A quenching section is disposed in a gas duct upstream of a gas desulfurization scrubbing tower and a scrubbing slurry is provided at that section for quenching and chemically reacting with the gas. A quench reaction product is collected, at a location between the quenching section and the scrubbing tower, for use in making commercial by-products, such as gypsum.

8 Claims, 2 Drawing Sheets

GAS QUENCH AND SCRUBBER DRAW-OFF SYSTEM

FIELD OF THE INVENTION

The present invention is concerned with a system for chemically removing sulfur oxides and other pollutants from gases. It is especially useful in a flue gas desulfurization, such as a flue gas desulfurization (FGD) scrubbing system for use in chemically removing sulfur oxides and other air pollutants from the flue gas of a combustion source and for use in producing chemical reaction products for the manufacture of commercial by-products.

BACKGROUND OF THE INVENTION

Industrial processes result in sulfur oxides evolving from materials of the product being manufactured, for example in the manufacturing of bricks in a brick kiln, sulfur oxides evolve from the clay. The present invention is for use with any process in which sulfur oxides result, in order that they might be prevented from being released to the atmosphere. For example, Flue Gas Desulfurization (FGD) scrubbing systems are used in many industrial applications in which fossil fuels, containing sulfur, are combusted in order to provide heat required for various processes. Electrical power plants, for example, which burn coal, fuel oil, gas and the like, use FGD for removing sulfur oxides from the combustion gases, so as to prevent contamination of the atmosphere.

In addition to preventing pollutants from entering the atmosphere, chemical reaction products, resulting from chemical reactions taking place in a gas scrubbing system can be a valuable source of material for the manufacture of commercial by-products, for example gypsum.

A typical scrubber tower is shown in FIG. 2 having a vertically elongated scrubbing chamber 1 through which the gas to be desulfurized flows. A gas duct 2 delivers the gas at a lower section of the scrubbing tower, and an exhaust gas duct 3 removes the treated gas from an upper section of the scrubbing tower. Intermediate the ducts a series of sprays 4, or the like, distribute scrubbing slurry for reacting with the sulfur oxide pollutants contained in the gas. Following such reactions, a slurry reaction product drops, by gravity, to a bottom portion of the tower which includes a collection section 5 for holding the slurry reaction product. In order to provide and replenish chemicals for the reactions, such as $MgSO_3$, $Ca(OH)_2$, $Mg(OH)_2$ and the like for reacting with the sulfur oxides of the gas, an alkaline slurry of such chemicals which can be prepared in mixing tank 6 is introduced into collection section 5. The material in collection section 5 is thus a scrubbing slurry containing liquid and solid phases of reactants and reaction products.

In order to maintain a desired level of scrubbing slurry in the collection section, a bleed stream 7 removes the scrubbing slurry from the collection section 5 for possible use in making commercial by-products.

A typical commercial by-product is gypsum. In a process for making gypsum the scrubbing slurry from bleed stream 7 is delivered to an oxidizer in which air or oxygen is combined with the scrubbing slurry in order to oxidize solid and liquid phase sulfites to sulfates. To promote dissolution of solid phase calcium sulfite in the oxidizer, the pH within the oxidizer should be less than 6.0 and preferably about 5.0. In the process of producing gypsum, once solid phase calcium sulfite is dissolved, oxidation of sulfites to sulfates occurs quickly and gypsum can be readily precipitated into a crystalline form.

However, in addition to the calcium sulfite, other alkaline solid phase constituents enter the oxidizer as well, that can raise the pH unless they are neutralized with an acid. These constituents are typically calcium carbonate from the alkaline slurry, unslaked calcium oxide or magnesium oxide, and magnesium hydroxide found with gypsum, that may be recycled from downstream processes. In order to maintain a favorable oxidizer pH, these alkaline constituents must be neutralized with an acid, preferably sulfuric acid.

Typically, there exists in the scrubbing slurry some soluble bisulfite ($HSO_3^{-1}$) that when oxidized will release an associated hydrogen ion. Released hydrogen ions then can neutralize the alkaline constituents that enter the oxidizer. Typically though, there is not enough acid associated with the bisulfites entering the oxidizer to neutralize all the alkaline constituents that enter the oxidizer, and additional acid is required to be added to the oxidizer to keep the pH within a range that allows oxidation to proceed quickly, as discussed above.

U.S. Pat. No. 6,695,018 describes a FGD system having a scoop disposed within the scrubbing tower and above an internal reaction tank, for collecting an effluent slurry of partially reacted scrubbing reagent and scrubbing reaction product, before they drain into the internal reaction tank. The partially reacted scrubbing reagent and scrubbing reaction product can then be withdrawn for use in manufacturing commercial by-products before the addition of fresh reagent raises the pH of the slurry of the internal reaction tank.

Although the collected effluent slurry of U.S. Pat. No. 6,695,018 may have a pH less than that of the slurry of the internal reaction tank, use of the withdrawn partially reacted scrubbing reactant and scrubbing reaction product may still require the addition of an acid in an oxidizer to adjust the pH to a level more favorable for the dissolution of solid phase calcium sulfite in the oxidizer.

OBJECTS OF THE INVENTION

It is an object of the invention to provide a system for removing sulfur oxides from gases, especially flue gases, and producing a gypsum by-product, without the need of adding an acid to the oxidizer.

SUMMARY OF THE INVENTION

The present invention is a gas desulfurization scrubbing system with a scrubbing tower having a scrubbing chamber where a scrubbing slurry contacts a gas to remove sulfur oxides therefrom and produces a slurry reaction product. The scrubbing tower includes a tower collection section below the scrubbing chamber for collecting the slurry reaction product for combining with an alkaline slurry to form the scrubbing slurry, a gas discharge duct above the scrubbing chamber, and a gas duct for delivering a gas through an inlet to the side of the scrubbing tower, situated between the scrubbing chamber and the tower collection section. The gas duct includes a quench section for contact of the gas with a portion of the scrubbing slurry, and a gas duct collection section in the gas duct between the quench section and the inlet to the tower, for collection of at least a portion of a quench reaction product resulting from contact of the portion of the scrubbing slurry with the gas in the gas duct.

BRIEF DESCRIPTION OF THE DRAWINGS

The invention will become more readily apparent from the following description of a preferred embodiment thereof shown, by way of example only, in the accompanying drawings, wherein.

DETAILED DESCRIPTION OF THE INVENTION

Figure 1:
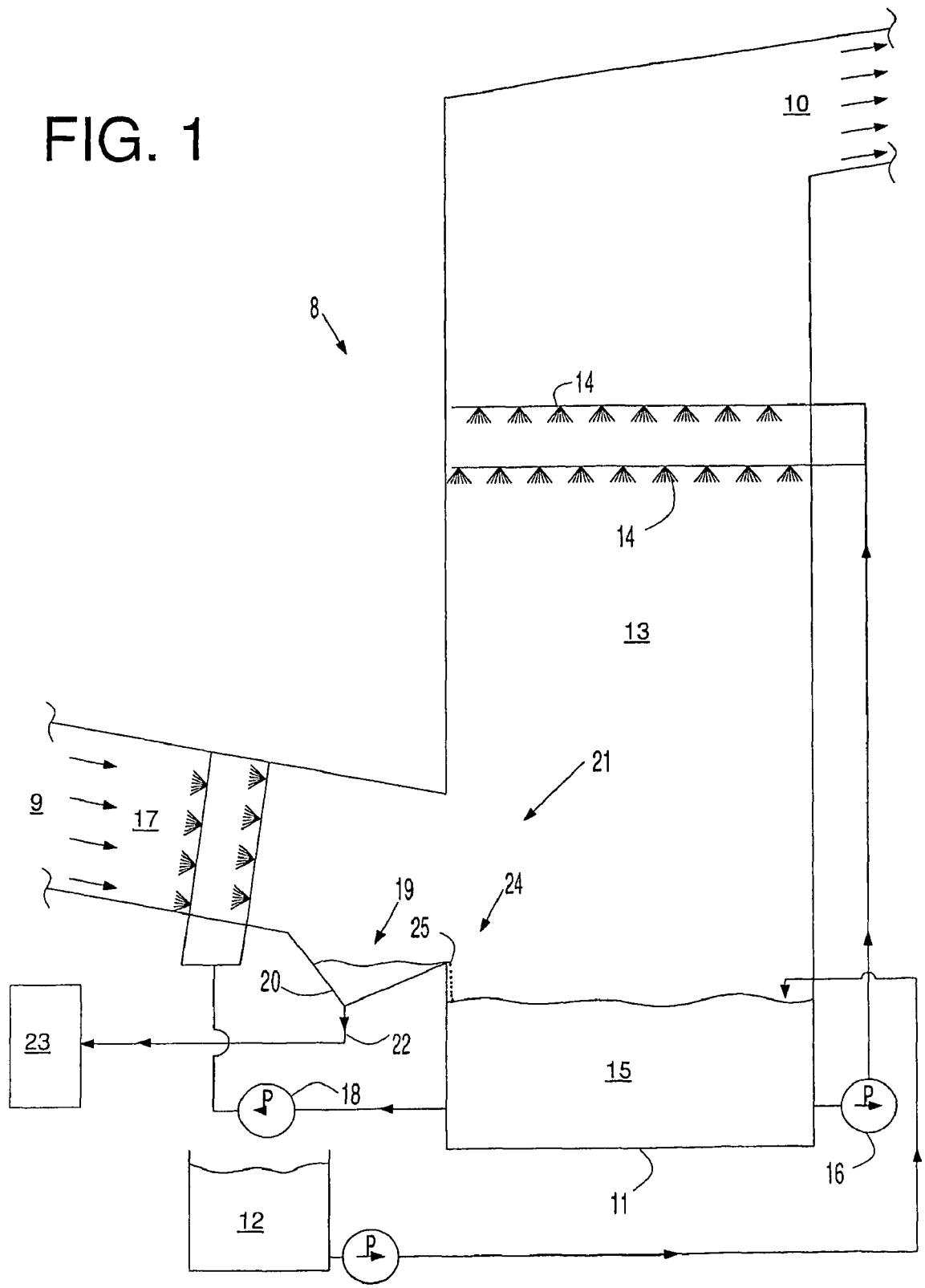
FIG. 1 is an illustration of the system of the present invention.
Figure 2:
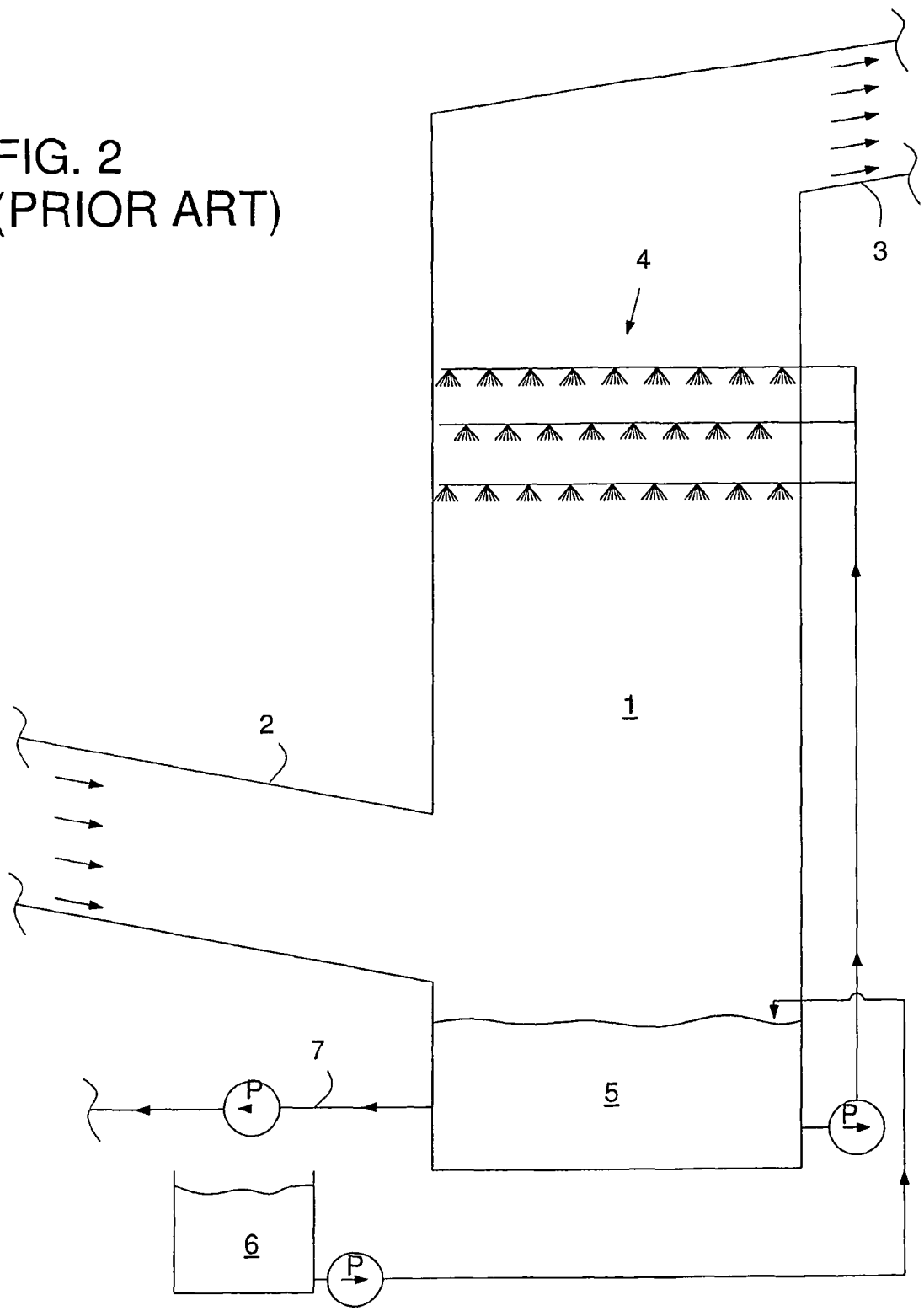
FIG. 2 is an illustration of a prior art FGD process.

FIG. 1 shows an illustration of a flue gas desulfurization scrubbing system of the invention. The system includes a vertically elongated scrubbing tower 8, flue gas duct 9 for delivering flue gas to the scrubbing tower, and flue gas discharge duct 10 for exhausting clean flue gas from the chamber. Located at a bottom portion of the scrubbing tower is a collection section 11 into which an alkaline slurry containing $SO_3$, $Ca(OH)_2$, $Mg(OH)_2$ and the like, from preparation tank 12, is pumped. Intermediate flue gas ducts 9 and 10, in a scrubbing chamber 13 are located sprayers 14, or the like, for delivering a scrubbing slurry 15 containing $MgSO_3$, $CA(OH)_2$, $Mg(OH)_2$ or like reactants in a suitable form for combining with $SO_3$, $SO_2$, HCl or other flue gas contaminants to remove them from the flue gas prior to exhausting the flue gas to the atmosphere. The reactants are delivered to the sprayers with use of pump 16. Slurry reaction products resulting from the chemical reactions of the scrubbing slurry and flue gas contaminants drop, by gravity, into collection section 11. The scrubbing slurry 15 is thus made up of a combination of the alkaline slurry and the slurry reaction products. Throughout the present specification, although a "flue gas duct" is used for describing the invention, it is to be understood that the term "flue gas duct" can include a gas duct from any process, through which sulfur oxides from the process are conveyed, and is not limited to a gas duct from a combustion gas system.

In order to provide a more acidic material to an oxidizer as discussed above, for producing a commercial by-product, such as gypsum, it is desirable to collect reaction products of the sulfur oxides removing reaction, prior to those reaction products being combined with the alkaline slurry, or the like, in collection section 11, as the addition of the alkaline slurry increases the pH of the scrubbing slurry, thus hindering reactions in an oxidizer.

In order to obtain a more acidic material, the present inventors have invented a new system, adaptable to an existing (FGD) scrubbing system, if desired, which provides a quench section 17 disposed in the flue gas duct 9, which delivers the flue gas to the scrubbing tower 8. In the configuration of the system of the invention, both a quench section 17 and the down stream scrubbing chamber 13 are provided for carrying out sulfur oxide removing chemical reactions. A scrubbing slurry for quench section 17 is provided from the tower collection section 11, as is the scrubbing slurry for scrubbing chamber 13. The scrubbing slurry is provided to quench section 17 with use of pump 18.

The quench section 17 performs the function of adiabatically humidifying or quenching the flue gas, from a combustion source, that is 205° C.-105° C. to a temperature of about 50° C. using scrubbing slurry 15 from the tower collection section 11 of the flue gas scrubbing tower 8. The quench section 17 is located within the flue gas duct upstream of and separate from the scrubbing tower. During the quenching operation, constituents of the scrubbing slurry including but not limited to $MgSO_3$, $Ca(OH)_2$, $Mg(OH)_2$ react with particulate $SO_3$, gaseous $SO_2$, and gaseous HCl to form $Mg[HSO_3]_2$, $Ca[HSO_3]_2$, and $MgCl_2$. The resulting quench reaction product which is a slurry containing liquid and solid phase reactants and products, can be drawn off and pumped to an ex-situ oxidizer while the quenched flue gas proceeds to the downstream scrubbing in scrubbing tower 8.

A benefit of this configuration is that once the above chemical reactions occur, the quench reaction product will contain magnesium and calcium bisulfites that drop the pH to <5.5. Before the quench reaction product can enter the tower collection section and become neutralized with the alkaline slurry it can be pumped to a down stream ex-situ oxidizer where all forms of sulfite are oxidized to sulfates and hydrogen ions are released. The released hydrogen ions, associated with the bisulfites, become available to neutralize carbonates, oxides, and hydroxides that may enter the ex-situ oxidizer from other sources, thus reducing or eliminating the need to add acid to the oxidizer.

The quench reaction product is collected in a flue gas duct collection section 19 which is disposed in the flue gas duct 9 between the quench section 17 and the inlet 21 to the scrubbing tower 8. The gas duct collection section 19, preferably having a trough 20 in a lower wall of the gas duct, is provided with a bleed stream line 22 for conveying the quench reaction product to an oxidizer 23. If more quench reaction product accumulates than is pumped to the oxidizer 23, it is allowed to spill into tower collection section 11 as shown at 24, preferably over a lip 25. The quenched gas proceeds to the scrubbing chamber 13 for further removal of sulfur oxides. In order to maintain a steady-state operation of the system solids density and liquor chemistry, as the amount of sulfur oxides that are removed changes, the volume of scrubbing slurry fed to the quench section 17 and the volume of quench reaction product bleed off must be varied appropriately.

The present invention provides a bleed stream through line 22 from a magnesium-enhanced-lime sulfur oxide absorber that is not first neutralized with an alkaline slurry. As a result of not first being neutralized, more of the soluble sulfites in the quench reaction product are in the bisulfite form. When fed to the ex-situ oxidizer 23 in this form, more hydrogen ions (acid) are available to neutralize alkaline carbonates, oxides, and hydroxides that may also enter the oxidizer. This reduces or eliminates the need to introduce an outside source of acid. It is possible if the desulfurization system is managed correctly to not only eliminate adding acid but to require by-product $Mg(OH)_2$ to be introduced to the oxidizer to keep the pH from falling below 5.0.

While specific materials, dimensional data, etc. have been set forth for purposes of describing embodiments of the invention, various modifications can be resorted to, in light of the above teachings, without departing from Applicants' novel contributions; therefore in determining the scope of the present invention, reference shall be made to the appended claims.

What is claimed is:

1. A gas desulfurization scrubbing system comprising:
a scrubbing tower having a scrubbing chamber where a scrubbing slurry contacts a gas to remove sulfur oxides therefrom and produces a slurry reaction product, a tower collection section below said scrubbing chamber for collecting the slurry reaction product for combining with an alkaline slurry to form the scrubbing slurry, and a gas discharge duct above said scrubbing chamber;
a gas duct for delivering a gas through an inlet to the side of the scrubbing tower situated between said scrubbing chamber and said tower collection section;
a quench section in said gas duct for contact of the gas with a portion of the scrubbing slurry;
a gas duct collection section in said gas duct, between said quench section and the inlet to the scrubbing tower, for collection of at least a portion of a quench reaction product resulting from contact of said portion of the scrubbing slurry with the gas, an oxidizer for use in processing the quench reaction product, means for conveying the quench reaction product from said gas duct collection section to said oxidizer, and means for conveying quench reaction product collected in said gas duct collection section, and not conveyed to said oxidizer, to said tower collection section.

2. The gas desulfurization scrubbing system of claim 1, further comprising an alkaline slurry tank for preparing the alkaline slurry, and means for conveying the alkaline slurry to the tower collection section.

3. A gas desulfurization scrubbing system comprising:

a scrubbing tower having a scrubbing chamber where a scrubbing slurry contacts a gas to remove sulfur oxides therefrom and produces a slurry reaction product, a tower collection section below said scrubbing chamber for collecting the slurry reaction product for combining with an alkaline slurry to form the scrubbing slurry, and a gas discharge duct above said scrubbing chamber;

a gas duct for delivering a gas through an inlet to the side of the scrubbing tower situated between said scrubbing chamber and said tower collection section;

a quench section in said gas duct for contact of the gas with a portion of the scrubbing slurry;

a gas duct collection section in said gas duct, between said quench section and the inlet to the scrubbing tower, for collection of at least a portion of a quench reaction product resulting from contact of said portion of the scrubbing slurry with the gas, an oxidizer for use in processing the quench reaction product, means for conveying the quench reaction product from said gas duct collection section to said oxidizer, and means for conveying quench reaction product collected in said gas duct collection section, and not conveyed to said oxidizer, to said tower collection section, wherein said gas duct collection section includes a trough in a lower wall of said gas duct wherein quench reaction product collects by gravity alone, and said trough includes an overflow portion for directing the quench reaction product, not conveyed to said oxidizer, to said tower collection section.

4. The gas desulfurization system of claim 1 wherein the gas is a flue gas from a combustion system.

5. The gas desulfurization system of claim 1 wherein the gas is a sulfur-containing gas resulting from manufacture of brick in a brick kiln.

6. A gas desulfurization scrubbing system comprising:

a scrubbing tower having a scrubbing chamber where a scrubbing slurry contacts a gas to remove sulfur oxides therefrom and produces a slurry reaction product, a tower collection section below said scrubbing chamber for collecting the slurry reaction product for combining with an alkaline slurry to form the scrubbing slurry, and a gas discharge duct above said scrubbing chamber;

a gas duct for delivering a gas through an inlet to the side of the scrubbing tower situated between said scrubbing chamber and said tower collection section;

a quench section in said gas duct for contact of the gas with a portion of the scrubbing slurry;

a gas duct collection section in said gas duct, between said quench section and the inlet to the scrubbing tower, for collection of at least a portion of a quench reaction product resulting from contact of said portion of the scrubbing slurry with the gas;

an oxidizer for use in processing the quench reaction product; and means for conveying the quench reaction product from said gas duct collection section to said oxidizer; wherein said gas duct collection section includes a trough in a lower wall of said gas duct wherein quench reaction product collects by gravity alone, and said trough includes in overflow portion for directing the quench reaction product, not conveyed to said oxidizer, to said tower collection section.

7. The gas desulfurization system of claim 6 wherein the gas is a flue gas from a combustion system.

8. The gas desulfurization system of claim 6 wherein the gas is a sulfur-containing gas resulting from manufacture of brick in a brick kiln.

* * * * *